United States Patent

[11] 3,605,036

[72] Inventor Bruce E. Barnaby
   Belmont, Calif.
[21] Appl. No. 675,983
[22] Filed Oct. 17, 1967
[45] Patented Sept. 14, 1971
[73] Assignee Laser Sciences, Inc.
   Bethel, Conn.

[54] METHOD AND APPARATUS FOR THERMOCHEMICALLY CONTROLLING THE GAS ATMOSPHERE OF A GAS COHERENT RADIATION GENERATOR
17 Claims, 1 Drawing Fig.

[52] U.S. Cl. ................................................. 331/94.5,
   313/174, 313/180, 315/108, 315/110, 316/3
[51] Int. Cl. ................................................. H01s 3/00
[50] Field of Search .......................... 331/94.5;
   316/5; 313/173; 315/108, 110

[56] References Cited
UNITED STATES PATENTS

| | | | |
|---|---|---|---|
| 3,388,314 | 6/1968 | Gould | 331/94.5 X |
| 3,389,288 | 6/1968 | Della Porta et al. | 313/174 |
| 3,401,296 | 9/1968 | Rigot | 313/174 |

OTHER REFERENCES

Carbone, " Long-Term Operation of a Sealed CO 2 Laser," IEEE J. of Quant. Electron, Vol. QE-3, No. 9, Sept. 1967.

Convert et al. " Laser Operation in Mercury Rare Gas Mixtures," Comptes Rendus Acad. Sci. Paris, vol. 258 Groupe 6, 23 March 1964, pp. 3259-60.

Taylor et al. " Effect of a Heater Platinum Wire on a Sealed CO 2 Laser System," Applied Physics Letters, vol. 11, No. 6, 15 Sept. 1967, pp. 80-182.

Witteman, W. J., " Inversion Mechanisms, Population Densities and Coupling-Out of a High Power Molecular Laser," Phillips Res. Reports 21, (2), April 1966 pp. 73-84

Primary Examiner—William L. Sikes
Assistant Examiner—R. J. Webster
Attorneys—Robert W. Dilts and Mellin, Moore & Weissenberger ABSTRACT: $CaCO_3$ is located inside the optical cavity of a $CO_2$ gas laser and is maintained at 680° C. to evolve $CO_2$ to replenish the gas atmosphere of the laser with $CO_2$ during operation. Titanium is located inside the optical cavity and is maintained at a temperature in the range of 700 to 900° C. to preferentially getter CO gas formed in the gas atmosphere of the laser during operation.

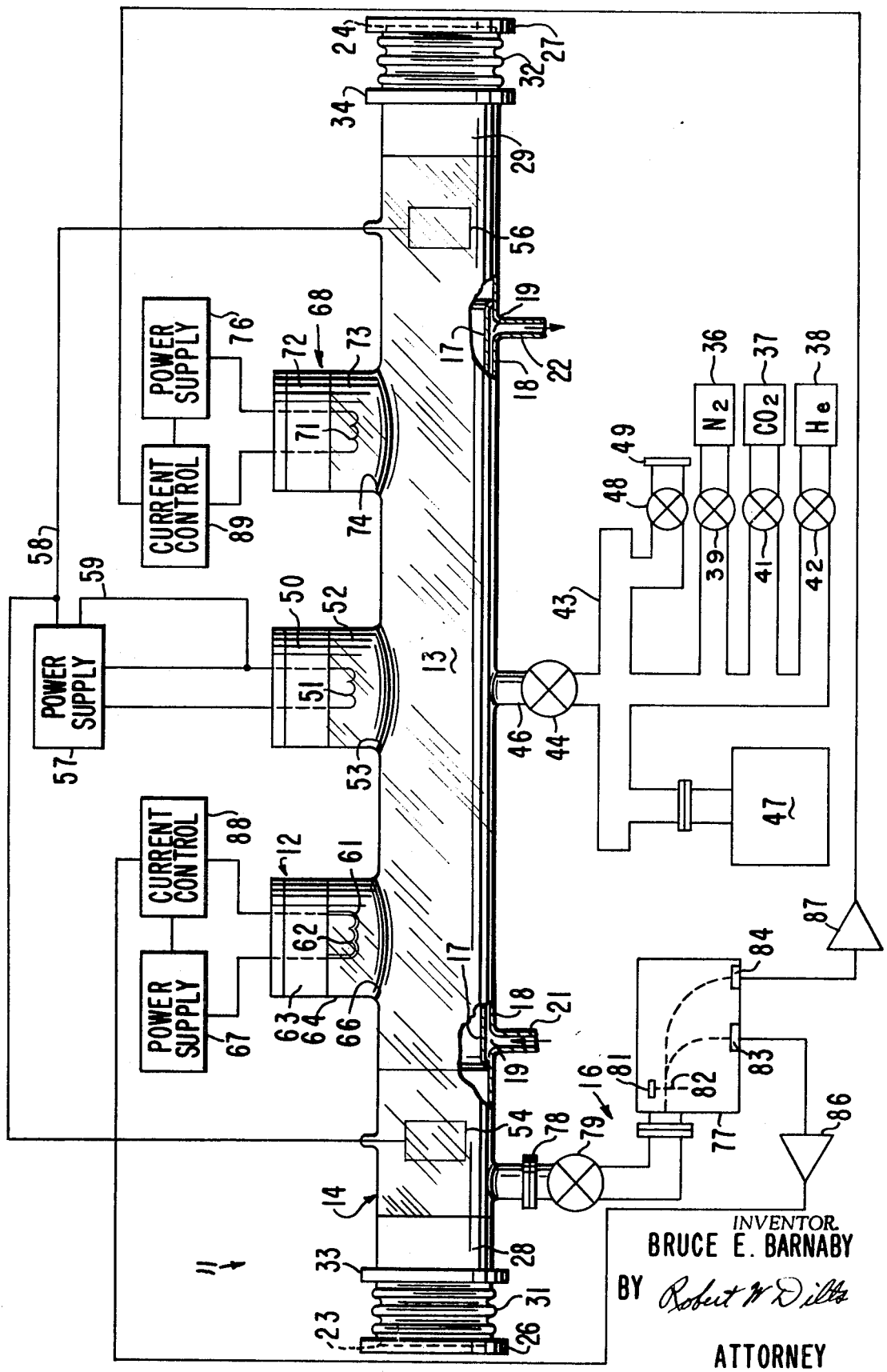

METHOD AND APPARATUS FOR THERMOCHEMICALLY CONTROLLING THE GAS ATMOSPHERE OF A GAS COHERENT RADIATION GENERATOR

BACKGROUND OF INVENTION

Gas-type coherent radiation generators have several distinct advantages when compared to solid state and crystal-type devices. In particular, the gas-type devices are capable of providing a continuous beam rather than just a pulsed beam. Furthermore, because the gas-type devices are able to provide continuous beams, they can yield a higher degree of coherence and a purer frequency than is possible with a solid state or crystal device, assuming of course, the proper gas atmosphere is maintained.

Coherent radiation generators have become an important tool for use in aircraft and spacecraft. Some of the more noteworthy uses of such generators are as beam generators for radar, carrier generators for communication equipment, and time base standards for instrumentation. In the past, the low power output and poor efficiency characteristics of gas-type coherent radiation generators have limited their usefulness in aircraft and spacecraft applications. However, $CO_2$ gas lasers have been constructed which have the ability of generating spectrally pure infrared continuous wave (CW) beams at power levels and efficiencies exceeding even those of solid state and crystal-type coherent radiation generators. Such characteristics suggest that $CO_2$ gas lasers would be useful in aircraft and spacecraft applications.

Unfortunately, however, during the normal operation of $CO_2$ gas lasers, the $CO_2$ supply contained in the gas atmosphere forming the gaseous laser material is depleted as a result of the $CO_2$ readily entering into various chemical reactions, for example, with the container or optical cavity of the laser:

$CO_2 + \text{metal} \rightarrow \text{metal oxide} + CO$ $CO_2 + \text{metal oxide} \rightarrow \text{higher oxide} + CO$ $CO_2 + \text{metal oxide} \rightarrow \text{metal carbonate}$;
with the structural components of the lasers:
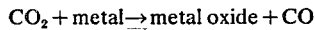
$BaO + CO_2 \rightarrow BaCO_3$

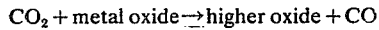
$W + CO_2 \rightarrow WO + CO$ $CO_2 + C \rightarrow 2 CO$;
and with residual gases commonly found present in gas atmosphere:
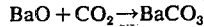
$CO_2 + H_2 \rightarrow H_2O + CO$

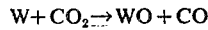
$CO_2 + CH_4 \rightarrow H_2 + 2 CO$ $CO_2 + H_2O \rightarrow H_2 + CO$ As 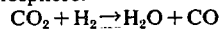the gaseous system approaches equilibrium by the above or other reactions, the characteristics of the discharge will begin to change, the power output will vary, efficiency will become poorer, and eventually the discharge will be quenched. Under these conditions, common, $CO_2$ gas lasers have a maximum useful lifetime of about 100 hours, and often much less.

To extend the lifetime of $CO_2$ gas lasers, it is the common practice to replenish the supply of $CO_2$ from an external reservoir connected to the gas laser by a continuous flow gas system. In such systems, the optical cavity containing the $CO_2$ is continuously pumped by a suitable vacuum pump and the gaseous laser material is continuously delivered to the cavity from the reservoir. Although such systems insure uniform replenishment and a stable gas atmosphere, hence, maintenance of the discharge for essentially an unlimited lifetime, the flow system used to replenish the $CO_2$ requires bulky valves and plumbing, and a weighty and space-consuming reservoir. All of these characteristics of the flow system are inconsistent with airborne and space applications.

Therefore, considerable advantage is to be gained by providing a technique for maintaining a proper gas atmosphere in gas-type coherent radiation generators over an extended period without resort to continuous gas flow systems whereby coherent radiation yields can be obtained having a high degree of coherence and a pure frequency. Other advantages will be realized where the technique for maintaining a proper gas atmosphere in gas-type coherent radiation generators extends the lifetime so that depletion of the gas components of the gas atmosphere forming the gaseous laser material is no longer a dominating influence on the operating lifetime of the generator.

SUMMARY OF INVENTION

The present invention relates to stabilizing the gas atmosphere of a gas-type coherent radiation generator. More particularly, it relates to stabilizing the gas atmosphere of gas-type coherent radiation generators by thermochemical techniques.

Accordingly, it is an object of this invention to maintain a proper gas atmosphere in a gas-type coherent radiation generator over an extended period.

More particularly, it is an object of the present invention to construct gas-type coherent radiation generators so as to be suitable for airborne and space applications.

Another object of the present invention is to maintain without resort to a continuous gas flow system a proper gas atmosphere in a gas-type coherent radiation generator having a gas atmosphere which tends to be rapidly depleted of certain components during normal operations.

A further object of this invention is to maintain a proper gas atmosphere in a gas-type coherent radiation generator in a manner so that the depletion of gas components of the gaseous coherent radiation generator material is no longer a dominating influence on the operating lifetime of the generator.

A more particular object of the present invention is to extend the lifetime of $CO_2$ gas lasers without resort to replenishing the gaseous laser material with a continuous gas flow system.

The present invention provides a thermochemical method and apparatus for realizing the foregoing and other objects and thereby overcomes many of the limitations and disadvantages of prior art gas-type coherent radiation generators. More specifically, in the method of the present invention, a thermochemically reactive source of the substance which is to be replenished in the depleted gas atmosphere forming the gaseous coherent radiation material is coupled in gas flow communication with the volume of the cavity in which the coherent radiation material is located. The source of the substance is heated to effect evolving of a gaseous form of the substance into the volume containing the depleted gas atmosphere. The source is maintained at a selected temperature corresponding to that which sustains the vapor pressure of the substance being replenished in the gas atmosphere at the level necessary to provide the desired amount of the substance in the gas atmosphere.

Although replenishing the gas atmosphere in this manner will extend the life of the coherent radiation generator well beyond that which would be possible without replenishment, the useful lifetime of the generator normally will be limited due to the accumulation of extraneous gases formed by reactions which deplete the gas atmosphere. Therefore, to extend the lives of generators limited by such accumulation of extraneous gases even further, it is contemplated that the volume in which the gas atmosphere is located is coupled in gas flow communication with a source of gettering material which preferentially getters the extraneous gas or gases which significantly limit the life of the generator. By gettering these extraneous gas or gases, they are removed from the gas atmosphere forming the gaseous coherent radiation material, thereby, inhibiting or preventing the destructive accumulation of the extraneous gases in the gas atmosphere. By inhibiting or preventing the destructive accumulation of the extraneous gases, the lives of the generators can be increased significantly.

The invention also provides an improved gas-type coherent radiation generator in which the foregoing method may be conducted particularly suited for airborne and space applications, although not limited to such applications. More particularly, the gas-type coherent radiation generator of the present invention includes a coherent radiation resonant cavity structure for housing a gaseous coherent radiation material provided with means to stimulate the gaseous material to emit coherent radiation. To enable replenishing of the gas atmosphere forming the gaseous coherent radiation material when depleted of a substance, a thermochemically reactive source of the substance is mounted within cavity structure outside the zone in which the coherent radiation discharge occurs during operation. Means are provided to heat the source to effect a thermochemical releasing of a gaseous form of the substance into the cavity. To maintain the proper gas atmosphere, means are provided to maintain the temperature of the source of the substance being replenished to that corresponding to that which sustains the vapor pressure of the substance in the gas atmosphere at the level necessary to provide the desired amount of the substance in the atmosphere.

When it is desired to inhibit or prevent the destructive accumulation of extraneous gases which may be formed in the gas atmosphere in the manner described hereinbefore, a source of gettering material which preferentially getters the destructive extraneous gases is mounted within the cavity structure outside the zone in which the coherent radiation discharge occurs during operation. Means are provided to maintain the getter material at the temperature at which effective gettering of the extraneous gases is achieved.

Referring to the single accompanying, drawing, an embodiment of the gas coherent radiation generator apparatus of the present invention which is particularly suited for conducting the method of the present invention is schematically illustrated. The method and apparatus of the present invention will be described in detail with respect to thermochemically controlling the gas atmosphere of a $CO_2$ laser. However, it should be appreciated that the method and apparatus of the present invention can also be employed to thermochemically control the gas atmosphere of other gas-type coherent radiation generators.

A $CO_2$ gas laser or coherent radiation generator 11 generally operates with a laser material formed by a gas mixture of helium (He), nitrogen ($N_2$) and carbon dioxide ($CO_2$), at pressures, for example, of 10, 1.2 and 1.0 Torr respectively. While the helium and nitrogen are relatively unaffected by normal operation, the carbon dioxide is depleted from the gas atmosphere by the various reactions noted hereinbefore. Without replenishing the $CO_2$ supply in the gas atmosphere, the depletion limits the useful life of the $CO_2$ gas laser 11 to a maximum of about 100 hours. In accordance with the method of the present invention, the supply of $CO_2$ is replenished by a temperature-controlled chemical reaction which evolves the type of gas, in the illustrated case $CO_2$ being depleted from the gas atmosphere. In $CO_2$ gas lasers, metal carbonates, and in particular the alkaline earth metal carbonates, family of chemical compounds are employed to replenish the $CO_2$. The alkaline earth metal carbonates are preferred over the other metal carbonates because the metal oxide residue remaining after the chemical reaction is inert and the characteristics of the residue in a vacuum and gaseous environments of $CO_2$ lasers are well known.

Examples of + more useful thermochemical reactions of the alkaline earth metal carbonates that can be used to replenish the $CO_2$ are as follows:

$$Be\ CO_3 \leftrightarrows BeO + CO_2$$

$$Ca\ CO_3 \leftrightarrows CaO + CO_2$$

$$Sr\ CO_3 \leftrightarrows SrO + CO_2$$

$$Ba\ CO_3 \leftrightarrows BaO + CO_2$$

$$Mg\ CO_3 \leftrightarrows MgO + CO_2,$$

Thermochemical reactions involving the alkaline earth metal carbonates are reversible hence, all three of the constituents, i.e., the alkaline earth metal carbonate, the alkaline earth metal oxide and the carbon dioxide, will always be present in quantities that are related to the ambient temperature of the system by the equilibrium constant $$K = \frac{P(XO)xP(CO_2)}{P(XCO_3)}$$

where P represents the vapor pressure of the indicated constituents and $x$ the metal forming the alkaline earth metal carbonate. By maintaining the temperature in a range wherein the alkaline earth metal carbonates and the metal oxides are in solid form, the vapor pressure of the $CO_2$ becomes equal to the equilibrium constant K, assuming that the ambient temperature of the $CO_2$ in the gas atmosphere is the same as that of the alkaline earth metal carbonate. Hence, the partial pressure of the $CO_2$ in the gas atmosphere can be maintained constant by adjusting the temperature of the alkaline earth metal carbonate to that productive of an equilibrium constant, K, value which corresponds to a $CO_2$ vapor pressure equal to the desired partial pressure of the $CO_2$. This operation results in the rate of evolution of the $CO_2$ from the alkaline earth metal carbonate source or source of replenishing material 12 being equal to the rate at which the $CO_2$ is depleted from the gas atmosphere. However, since the ambient temperature of the $CO_2$ in the gas atmosphere of the volume 13 defined by the resonant optical cavity 14 of the laser 11 will be slightly less than that of the solid alkaline earth metal carbonate source 12, the alkaline earth metal carbonate source 12 would be operated at a temperature slightly above that predicted by the above equilibrium constant equation to achieve a balance between the evolution and depletion rates of $CO_2$. This operating temperature can be determined empirically and, if desired, controlled automatically by providing means 16 to sense the partial pressure of the $CO_2$ in the gas atmosphere and adjust the temperature of the source 12 to account for variations in the ambient temperature of the $CO_2$ in the gas atmosphere. Apparatus for automatically controlling the temperature of the source 12 will be described in detail hereinbelow with respect to the detailed description of the apparatus of the present invention.

An example of the method of the present invention will be described in detail as practiced to maintain the proper gas atmosphere in $CO_2$ laser-type coherent radiation generator apparatus of the present invention. In accordance with the present invention, the $CO_2$ gas laser 11 includes a tubular optical cavity 14, for example, of quartz having inside and outside walls 17 and 18 spaced apart to define a space 19 for circulating coolant from a supply (not shown) via the feed and return conduits 21 and 22 to dissipate the heat generated in the cavity walls during operation. The optical cavity 14 defines a cylindrical volume 13 of about 64 centimeters (cm.) long and 2.5 cm. in diameter. Reflective mirrors 23 and 24 carried by flanges 26 and 27 are joined to the opposite ends 28 and 29 of the tubular optical cavity 14 by adjustable bellows 31 and 32 and the flanges 33 and 34 to form a gastight enclosure for the gaseous laser material. Mirror 23 is gold-plated for maximum reflection, while mirror 22 is partially transparent so that output coherent radiation can be obtained from the gas laser 11. The partially transparent mirror 22 is constructed of material according to the wavelength of the coherent radiation output provided by the coherent radiation generator. $CO_2$ gas lasers provide an output at a wavelength of 10.6 microns. Mirror 22 of sodium chloride will be partially transparent at this wavelength.

To prepare the gas laser 11 for operation, nitrogen, carbon dioxide and helium gas sources 36, 37 and 38 are connected through respective flow control valves 39, 41 and 42 to a manifold 43 and shutoff valve 44 to an inlet port 46 of the tubular optical cavity 14. The gas sources provide the components to form the proper gas atmosphere in the volume 13 of the optical cavity 14. The flow control valves are respectively adjusted and controlled to provide a total gas pressure in the optical cavity 14 of about 12.2 Torr, with the partial pressure of helium being about 10 Torr, that of nitrogen being about 1.2 Torr and that of carbon dioxide being about 1.0 Torr. Prior to and during the charging of the optical cavity 14 with the desired gas atmosphere, a vacuum pump 47 is connected to the manifold 43 to purge the cavity 14 of undesirable extraneous gases. The optical cavity 14 also is coupled to a normally closed safety valve 48 and outlet-to-air port 49 connected to the manifold 43 to allow the volume 13 to be coupled quickly to atmosphere in the case of a malfunction, e.g., causing a destructive overpressure condition in the optical cavity 14 during the charging operation. After the laser 11 is provided with the proper gas atmosphere, the shutoff valve 44 is closed and the manifold 43 is disconnected from the laser 11.

Either standard DC or RF electrodeless techniques may be employed to initiate a discharge to stimulate the $CO_2$ of the gas atmosphere to emit the preferred coherent radiation. In the illustrated embodiment, a double-ended discharge column is initiated by DC techniques. A thermionic cathode 51 is mounted on a tube header 50 outside the volume 13 whereat the discharge is initiated in a cylindrical housing 52 extending perpendicularly from one side of the tubular optical cavity 14. The tube header 50 is at one end of the housing 52 and the opposite end 53 of the housing is open to provide communication with the volume 13. Two open-ended cylinders 54 and 56 serving as anodes are located coaxially within the tubular optical cavity at its opposite ends 28 and 29. To initiate the discharge, the output of a current limited power supply 57 is connected between the anodes 54 and 56 and the cathode 51. The positive terminal 58 of the power supply 57 is operated at ground potential and is connected to both of the anodes 54 and 56. The negative terminal 59 of the power supply 57 is connected to cathode 51. The power supply 57 also includes a filamentary source to provide heating current to the thermionic cathode 51. The power supply 57 provides a DC potential of 3000 volts and establishes a discharge current of 100 milliamps (ma).

Pursuant to the present invention, thermochemical means are provided to control the quantity of $CO_2$ gas which, under normal operating conditions, is rapidly depleted from the gas atmosphere forming the laser material. To replenish the depleted $CO_2$, a source 12 of $CaCO_3$ is located in gas flow communication with the volume 13. For example, the $CaCO_3$ source 12 could form a coating 61 on a platinum wire heater 62 mounted on a tube header 63. Platinum is preferred as the heater material because it is inert. The tube header 63 forms one end of a cylindrical housing 64 which extends perpendicularly from one side of the tubular optical cavity 14. The end 66 of the housing joined to the cavity 14 is opened to allow gas flow communication between the volume 13 and $CaCO_3$ source 12.

To evolve $CO_2$ at the desired rate, the platinum wire heater 62 is connected to a 10 watt (W), power supply 67 adjusted to pass the necessary current through the heater 62 to heat the $CaCO_3$ coating 61 to the operating temperature required to effect the desired evolution rate. To maintain a $CO_2$ partial pressure of 1.0 Torr under conditions described hereinabove, current through the platinum wire heater 62 is adjusted to maintain the operating temperature of the $CaCO_3$ coating at about 680° C. Proper operating temperature for other $CO_2$ partial pressure levels can be found in the reference F. Daniels, *Outlines of Physical Chemistry*, John Wiley & Sons, Inc., New York (1948).

Whereas without replenishing the $CO_2$, the maximum useful life of the gas laser 11 will be limited to about 100 hours, 6 milligrams (mg) of $CaCO_3$ maintained at the 680° C. operating temperature will extend the useful life of the $CO_2$ gas laser to about 500 hours. Of course if a longer life is desired, the amount of $CaCO_3$ would be increased.

As explained hereinbefore, other alkaline earth metal carbonates can be employed to provide a replenishing supply of $CO_2$. The proper operating temperatures relative to the desired partial pressure of $CO_2$ in the gas atmosphere forming the laser material can be found by consulting the above-identified reference. In those cases where such information is not readily available for the materials that are considered for sources for replenishing constituents forming the gas atmosphere of gas-type coherent radiation generators, the exact temperature and quantity of material necessary to sustain operations for a desired life can be determined by empirical methods.

In the detailed example described, a separate source 12 was used to replenish the $CO_2$ in the gas atmosphere. However, many thermionic cathodes or emitters, for example, as described in the article A. H. W. Beck, High-Current-Density Thermionic Emitters: A Survey, Proceedings of the Institute of Electrical Engineers, July 1959, Part B, pp. 372–390, are formed from alkaline earth metal carbonates. Hence, the method of the present invention could be practiced either by employing separate sources of replenishing material or, in the case of $CO_2$ laser DC initiated discharge type devices, by constructing the thermionic cathode of alkaline earth metal carbonates whereby the cathode serves the dual purposes of initiating and maintaining the discharge and as the source of replenishing material.

By providing the gas-type coherent radiation generator 11 with a source 12 for replenishing material depleted from the gas atmosphere forming the gaseous laser material, the life of the generator 11 can be extended significantly. However, as explained hereinbefore, extraneous gases formed by the reactions depleting the constituent or constituents accumulate and eventually cause the discharge to be quenched. In the case of $CO_2$ gas lasers, carbon monoxide (CO) rapidly accumulates limiting the maximum useful life to about 1000 hours. By removing the extraneous gas or gases which are determining factors in significantly limiting the operating life of the gas-type coherent radiation generator, the operating life of the generator can be significantly increased beyond that which would be the maximum in the absence of the removal of the extraneous gas or gases. In accordance with the present invention, it is contemplated that the deleterious gases which accumulate in the gas atmosphere will be removed by placing a source of gettering material 68 in gas flow communication with the volume 13 containing the gas atmosphere. The gettering material is maintained at a temperature at which effective gettering of the extraneous gases either by chemisorption or phisorption is achieved.

Preferably, gettering material is selected which preferentially getters the extraneous gases relative to the preferred constituents of the gas atmosphere. However, gettering of the preferred constituents of the gas atmosphere can be tolerated as long as the gettering rate of the preferred gases is less than that of the deleterious extraneous gases which are to be removed from the gas atmosphere. For example, to remove CO from the gas atmosphere of $CO_2$ gas lasers, any of the common CO gettering materials, such as, barium, titanium, zirconium and thorium, can be used. Each of these getters $CO_2$ as well as CO and would, therefore, contribute to the depletion of $CO_2$. However, titanium getters CO at a much higher rate than $CO_2$ and, therefore, is preferred as the gettering material source 68. When using titanium gettering material, it is maintained at a temperature in the range of 700 to 900° C.

Referring again to the figure, the titanium source 68 could be in the form of titanium wire heater 71 mounted on a tube header 72. The tube header 72 forms one end of a cylindrical housing 73 which extends perpendicularly from one side of the tubular optical cavity 14. The end 74 of the housing joined to the cavity 14 is opened to allow gas flow communication between the volume 13 and titanium source 68.

To effectively getter CO whereby the $CO_2$ gas laser 11 can be operated significantly longer than 1000 hours, the titanium wire heater 71 is connected to a 10 W. power supply 76 adjusted to pass the necessary current through the heater 71 to heat the titanium gettering material to the operating temperature required to effect the desired gettering. Optimum gettering of CO is achieved by adjusting the current through the titanium heater 71 to maintain the operating temperature of the titanium in the range of 700 to 900° C.

In the illustrated embodiment, the method and apparatus of the present invention was described as employed to replenish and remove only one constituent of the gas atmosphere forming the laser material of a gas-type coherent radiation generator. However, in those cases where more than one of the constituents of the gas atmosphere has to be replenished or removed in order to sustain operations for a lengthy period, additional appropriate thermochemical sources of replenishing material or gettering material could be provided as needed.

It should be appreciated that when gettering material is used that preferentially getters the life limiting extraneous gases, such as CO, at a much higher rate than the desired gas atmosphere constituents forming the gaseous coherent radiation material, gettering alone, i.e., without replenishing depleted desired constituents, can be employed to extend the life of the coherent radiation generators.

In some instances, relative proportions of the constituents of the gas atmosphere must be accurately controlled, and in others, it is desirable to automatically exercise control over the evolution rate of the gas supplied by the source of replenishing material 12 and also the gettering rate of the gettering material source 68 to, for example, adjust for correctable malfunctions. In such cases, means 16 are provided to sense the partial pressure of the gas of interest and adjust the current supplied to the heater which controls the amount of the gas present in the volume 13. Such a means could be a mass spectrometer 77 coupled in gas flow communication to a port 78 on the tubular optical cavity 14 through a leak valve 79 adjusted to control the gas flow rate from the cavity 14 to the mass spectrometer 77. In the case of the $CO_2$ gas laser 11, the mass spectrometer 77 is provided with an electron gun 81 at its input which generates an ionizing electron beam 82 for ionizing the CO and $CO_2$ gas entering the spectrometer 77 from the cavity 14. Ion detectors 83 and 84 are located to detect ionic species of mass numbers 44, or $CO_2$, and 28, or CO passing through the mass spectrometer 77. Each of the ion detectors 83 and 84 are connected to one of the amplifiers 86 and 87 each of which provides an output voltage signal whose magnitude is proportioned to the magnitude of the ion current impinging the associated ion detector. The output of the amplifier 86 is connected to a current control circuit 88 serially connected between the power supply 67 and $CaCO_3$ coated heater wire 62. The output of the amplifier 87 is connected to a second current control circuit 89 serially connected between the power supply 76 and titanium heater wire 71. Both of the current control circuits 88 and 89 are of the type which in response to a change in input voltage causes a corresponding change in current output, hence, current to the associated heater wire. In the illustrated example, the current control circuit 88 in circuit connection with the heater wire 62 of the source 12 for replenishing $CO_2$ is adjusted so that an increase in the magnitude of the output voltage of the amplifier 86, which corresponds to an increase in the partial pressure of the $CO_2$ in the gas atmosphere, causes a proportionate decrease in the current to the heater wire 62, hence, in the evolution rate of $CO_2$ from source 12. Also, the current control circuit 89 in circuit connection with the titanium heater wire 71 of the getter source 68 is adjusted so that an increase in the magnitude of the output voltage of the amplifier 87, which corresponds to an increase in the partial pressure of the CO in the gas atmosphere, causes a proportionate increase in the amount of current to the titanium heater wire 71, hence, in the gettering rate of CO by the titanium.

While the present invention has been described in terms of specific steps in the method and with respect to a single illustrated embodiment, it is apparent that numerous modifications and variations are possible for realizing the simplified, compact and lightweight gas coherent radiation generator in accordance with the present invention. Hence, the foregoing description is not intended to limit the invention except by the terms of the following claims:

I claim:

1. A method of thermochemically maintaining a desired gas atmosphere forming the gaseous coherent radiation material of a gas-type coherent radiation generator having a resonant cavity structure defining a volume in which the gas atmosphere is located, the steps comprising, coupling a thermochemically reactive source of a substance to be supplied to the gas atmosphere in gas flow communication with the volume in which the gas atmosphere is located heating the thermochemically reactive source to a temperature to effect evolving of a desired gaseous form of the substance into the volume in which the gas atmosphere is located, maintaining the thermochemically reactive source at a temperature which sustains a vapor pressure of the substance at a level to provide a selected amount of the substance in the gas atmosphere; coupling a source of gettering material which getters an undesired gaseous form of the substance which tends to accumulate in the gas atmosphere and limit the operating life of the coherent radiation generator in gas flow communication with the volume in which the gas atmosphere is located, and maintaining the gettering material at a temperature at which effective gettering of the undesired gaseous form occurs.

2. The method according to claim 1 further including the steps of sensing the amount of the substance in the gas atmosphere, adjusting the temperature of the thermochemically reactive source in response to the sensed amount of the substance to maintain the amount of the substance in the gas atmosphere at a selected level, sensing the amount of the life-limiting extraneous gas in the gas atmosphere, and adjusting the temperature of the gettering material in response to the sensed amount of the extraneous gas to maintain the amount of the extraneous gas at a selected level.

3. The method according to claim 1 wherein carbon dioxide ($CO_2$) substance is supplied to the gas atmosphere of a $CO_2$ gas laser, and said thermochemically reactive source is a metal carbonate.

4. The method according to claim 3 wherein said thermochemically reactive source is an alkaline earth metal carbonate.

5. The method of claim 4 wherein the alkaline earth metal carbonate is maintained at a temperature productive of $CO_2$ vapor pressure at about the selected level of the $CO_2$ partial pressure in the gas atmosphere.

6. The method of claim 4 wherein the thermochemically reactive source is selected from the group consisting of calcium carbonate ($CaCO_3$), strontium carbonate ($SrCO_3$) and barium carbonate ($BaCO_3$).

7. The method of claim 6 wherein the thermochemically reactive source is $CaCO_3$ and is maintained at a temperature productive of a $CO_2$ vapor pressure at about the selected level of the $CO_2$ partial pressure in the gas atmosphere.

8. The method according to claim 3 wherein carbon monoxide (CO) accumulates in the gas atmosphere to limit the operating life of the $CO_2$ gas laser further including the steps of coupling a source of gettering material which getters CO in gas flow communication with the volume in which the gas atmosphere is located, and maintaining the gettering material at a temperature at which effective gettering of the CO occurs.

9. The method according to claim 8 wherein the gettering material is selected to preferentially getter CO.

10. The method according to claim 9 wherein the gettering material is titanium, and said titanium is heated to a temperature at which effective gettering of CO occurs.

11. The method according to claim 10 wherein said thermochemically reactive source is an alkaline earth metal carbonate.

12. The method according to claim 11 wherein the thermochemically reactive source is $CaCO_3$ and is maintained at a temperature productive of a $CO_2$ vapor pressure at about the selected level of $CO_2$ partial pressure in the gas atmosphere.

13. A method of thermochemically inhibiting the accumulation of undesirable extraneous gases in the gas atmosphere forming the gaseous coherent radiation material of a gas-type coherent radiation generator having a resonant cavity structure defining a volume in which the gas atmosphere is located, the steps comprising, coupling a source of gettering material which getters the undesirable extraneous gases in gas flow communication with the volume in which the gas atmosphere is located, and maintaining the gettering material at a temperature at which effective gettering of the extraneous gases occurs.

14. In a gas-type coherent radiation generator including a resonant cavity defining a volume for confining gaseous coherent radiation material, means for initiating a discharge in the cavity, and reflective mirrors, THE IMPROVEMENT COMPRISING; a first housing joined to and opening into one side of the resonant cavity; a thermochemically reactive source of a gaseous coherent radiation material essential to the operation of the radiation generator mounted within said housing; means for heating the source to effect evolving of said gaseous coherent radiation material; a second housing joined to and opening into one side of the resonant cavity, a source of gettering material mounted within said housing, said gettering material of a type which getters an undesired form to which said gaseous radiation material is converted during operation and which tends to accumulate in the cavity and limit the operating life of the generator, and means for maintaining the source of gettering material at a temperature for effective gettering of said undesired form of said gaseous radiation material.

15. The apparatus according to claim 14 wherein said means for heating the thermochemically reactive source is a first filamentary heater mounted within said first housing in contact with said source and a power supply electrically connected thereto to provide current to effect the heating of the thermochemically reactive source, and said means for maintaining the temperature of the gettering material is a second filamentary heater mounted within said second housing in contact with said gettering material and a power supply electrically connected to provide current to maintain the getter material at the desired temperature.

16. The apparatus according to claim 15 wherein said coherent radiation generator is a $CO_2$ gas laser, said thermochemically reactive source is calcium carbonate ($CaCO_3$) coated on the first filamentary heater, and said gettering material is titanium forming said second filamentary heater.

17. The apparatus according to claim 15 further including means to sense the amount of substance forming the gaseous coherent radiation material and the amount of extraneous gas in said volume, means responsive to said sensing means to control the current to the first filamentary heater in accordance with the amount of substance in said volume, and means responsive to said sensing means to control the current to the second filamentary heater in accordance with the amount of extraneous gas in said volume.